US011103887B2

(12) United States Patent
Kendall et al.

(10) Patent No.: US 11,103,887 B2
(45) Date of Patent: Aug. 31, 2021

(54) MULTIPURPOSE MACHINE FOR SURFACE TREATMENT AND RELATED METHOD

(71) Applicant: J.H. FLETCHER & CO., Huntington, WV (US)

(72) Inventors: William Garnet Kendall, Chesapeake, OH (US); Sean Joseph McQuerrey, Jr., Huntington, WV (US); Garron Alan Ross, Huntington, WV (US); Lyle Abraham Crum, Huntington, WV (US); Robert Dean Burgess, Huntington, WV (US)

(73) Assignee: J.H. FLETCHER & CO., Huntington, WV (US)

( * ) Notice: Subject to any disclaimer, the term of this patent is extended or adjusted under 35 U.S.C. 154(b) by 0 days.

(21) Appl. No.: 16/640,630

(22) PCT Filed: Jan. 16, 2019

(86) PCT No.: PCT/US2019/013781
§ 371 (c)(1),
(2) Date: Feb. 20, 2020

(87) PCT Pub. No.: WO2019/143674
PCT Pub. Date: Jul. 25, 2019

(65) Prior Publication Data
US 2020/0353495 A1 Nov. 12, 2020

Related U.S. Application Data

(60) Provisional application No. 62/697,125, filed on Jul. 12, 2018, provisional application No. 62/627,739, filed on Jan. 16, 2018.

(51) Int. Cl.
*B05B 13/00* (2006.01)
*B05B 13/04* (2006.01)
(Continued)

(52) U.S. Cl.
CPC ........ *B05B 13/005* (2013.01); *B05B 13/0405* (2013.01); *B05B 13/0431* (2013.01);
(Continued)

(58) Field of Classification Search
USPC ....... 118/313–315, 323, 326, 308, 309, 300; 451/39, 92
See application file for complete search history.

(56) References Cited

U.S. PATENT DOCUMENTS 3,770,062 A * 11/1973 Riggs ..................... A62C 31/24
169/24
5,788,158 A 8/1998 Relyea
(Continued)

FOREIGN PATENT DOCUMENTS

WO WO-2015172248 A1 * 11/2015 ............... H02G 1/02

OTHER PUBLICATIONS

Notice of Allowance dated Dec. 14, 2020 for CA Application No. 3078632 filed Jan. 16, 2019.

*Primary Examiner* — Yewebdar T Tadesse
(74) *Attorney, Agent, or Firm* — Dickinson Wright PLLC; Andrew D. Dorisio

(57) ABSTRACT

An apparatus for treating a surface has a vehicle including an extensible boom. A multi-purpose hood is attached to the boom. The hood includes at least one nozzle for spraying a fluid through an outlet of the hood, the nozzle adapted for reciprocating, non-rotational movement in a generally linear direction relative to the opening in the hood. The multi-purpose hood may be adapted for rotating independently about three different axes, and may include a first actuator for controlling a roll of the hood, a second actuator for controlling a yaw of the hood, a third actuator for controlling a pitch of the hood, and a fourth actuator for controlling an extension of the boom and a second actuator for controlling (Continued)

a swing of the boom. The extensible boom may be connected to a telescoping conduit for communicating fluid along the boom to or from the multi-purpose hood. Related methods are also disclosed.

18 Claims, 17 Drawing Sheets

(51) Int. Cl.
*B05B 14/30* (2018.01)
*B08B 3/02* (2006.01)
*B24C 3/06* (2006.01)
*B24C 9/00* (2006.01)

(52) U.S. Cl.
CPC .............. *B05B 14/30* (2018.02); *B08B 3/024* (2013.01); *B24C 3/06* (2013.01); *B24C 9/00* (2013.01)

(56) References Cited

U.S. PATENT DOCUMENTS

| | | | |
|---|---|---|---|
| 6,189,473 B1 | 2/2001 | Appel et al. | |
| 6,315,648 B1 * | 11/2001 | Neer | B24C 3/062 |
| | | | 451/92 |
| 6,461,231 B1 * | 10/2002 | Taylor | F16L 45/00 |
| | | | 451/92 |
| 2016/0228733 A1 | 8/2016 | Ceresani | |
| 2017/0237242 A1 | 8/2017 | Ewert | |

\* cited by examiner

MULTIPURPOSE MACHINE FOR SURFACE TREATMENT AND RELATED METHOD

This patent application claims the benefit of U.S. Provisional Patent Application Ser. Nos. 62/617,739 and 62/697,125, the disclosures of which are incorporated herein by reference.

TECHNICAL FIELD

This disclosure relates to surface treatment of materials and, more particularly, to a multi-purpose machine which can provide high pressure water washing, ultra-high pressure water blasting, abrasive grit blasting with the ability to connect to a dust/grit collection device with recycling capability, surface dust removal and capture capability, surface painting capability, and related method.

BACKGROUND

Traditional surface preparation of large structures, tanks, and ships require multiple steps including pressure washing the surface, removal of paint and rust by abrasive or ultra-high pressure water jets, cleaning of any residual dust or particles from the working surface, and then painting or coating of the cleaned surface. All of these processes typically involves using scaffolding or a man lift to allow a person to manually use handheld pressure washers, grit blast nozzles, blow down hoses, and paint guns. The efficiency and productivity of this conventional approach largely depends on the strength, skill and accuracy of the operator in controlling the nozzle speed, angle and distance.

During all of these processes, the operator is subject to difficult ergonomic conditions, hazards due to working at heights, fatigue due to the physical requirements of holding devices with heavy supply hoses, and environmental and health concerns due to vapors and particulates introduced into the surrounding working area.

To contain dust, abrasive grit, and paint generated during the processes; the item to be blasted with current manual devices is typically encapsulated. This contains the material inside the encapsulated area; however, it allows the material to first enter the atmosphere where the worker is located and then fall to the ground. After the surface is blasted, then the dust, abrasive grit, and paint must be collected and disposed of.

Accordingly, a need is identified for a multi-purpose machine that addresses the foregoing problems, and perhaps others yet to be discovered.

SUMMARY

This disclosure relates to surface treatment of materials and, more particularly, to a multi-purpose machine and related methods. Specifically, the machine proposed may be adapted to provide one or more of high-pressure water cleaning, ultra-high-pressure water blasting, abrasive grit blasting with the ability to connect to a dust/grit collection device with recycling capability, a surface dust removal and capture capability, and surface painting capability.

The machine may be used in connection with a working surface not readily accessible from a ground location (such as an external hull of a ship, large storage tank, building, tower, or like). The machine may comprise remote control system (such as by wireless (radiofrequency) signal), a mobile chassis, a working apparatus (e.g., a hood and support bracket with moveable arms), and a lifting mechanism which may further comprise an extensible boom for extending the position of the working apparatus at a distal end. The boom may also be configured to adjust the angle of the working apparatus in order to adapt to the differing contours of an irregularly shaped or curved workpiece, such as large ships and storage tanks. The boom may be supported by a wheeled or otherwise movable base vehicle, which thus allows the machine to be selectively repositioned relative to the workpiece to locations beyond the reach of the boom.

One possible embodiment of a high pressure washer may include one or more nozzles for surface washing/cleaning. The nozzles may be mounted to oscillating arms creating a back and forth motion. The movement speed of the arms is monitored by a speed sensor to allow automated speed control of each cycle and also variable speed within each cycle for improved blast pattern. A fluid, such as water, any cleaning agent, and pressure pumps used for washing may be supplied from an external source.

One possible embodiment of the ultra-high pressure water blaster may include one or more ultra-high pressure water nozzles for surface treatment. The water nozzles may be mounted to oscillating arms creating a back-and-forth motion. The movement speed of the arms is monitored by a speed sensor to allow automated speed control of each cycle and also variable speed within each cycle for an improved blast pattern. The water and pressure pumps used for blasting may be supplied from an external source.

One possible embodiment of a grit blasting hood includes a perimeter, which may be generally rectangular. The hood may include a shroud and a seal for sealing the perimeter of the shroud. This seal may be flexible, and may be biased to ensure a proper sealing engagement is formed with the surface of the workpiece undergoing treatment.

The hood may include one or more grit blast nozzles, which may be movable within the interior compartment defined by hood. The grit blast nozzles may be mounted to oscillating arms creating a back and forth motion, which is thus non-rotational. The movement speed of the arms may be monitored by a speed sensor to allow automated speed control of each cycle and also variable speed within each cycle to create an improved blast pattern. The nozzles may be configured to allow any abrasive to be used, including possibly wet abrasives. The abrasive material used for blasting may be supplied to the hood under fluid (air or water or air/water mist) pressure from an external source, to provide the desired abrasion to the surface.

The hood may include one or more outlets for collecting abrasive, dust and paint or rust particles removed or deflected from the treatment surface. An external vacuum source may be connected to the outlets to apply a negative pressure at an appropriate level to vacuum the dust from the hood or shrouds. A second machine may be supplied to provide the vacuum air, dust collection, and grit recycling.

In one embodiment, the collector/recycler is configured to apply a higher flow rate than the flow rate of the abrasive provided. This helps to ensure that no material escapes in order to conserve material and keep the surrounding work area clean.

In another embodiment, the hood may be replaced with individual hoods (shrouds) mounted to each nozzle for dust and grit collection and recycling.

One possible embodiment of the surface cleaning hood includes a perimeter (which may be generally rectangular) configured to be maintained close to the workpiece surface. The hood may include a shroud and a seal for sealing the perimeter of the shroud. This seal may be flexible, and may be biased to ensure a proper sealing engagement is formed with the surface of the workpiece.

The hood may include one or more air blast nozzles, which may be movable within the interior compartment defined by hood. The air blast nozzles may be mounted to oscillating arms creating a back and forth motion. The movement speed of the arms is monitored by a speed sensor to allow automated speed control of each cycle and also variable speed within each cycle for improved blast pattern. The air pressure used for blasting air may be supplied to the hood from an external source.

The hood may include one or more outlets for collecting abrasive, dust and paint or rust particles removed from the working surface. An external vacuum source may be connected to the outlets to apply a negative pressure at an appropriate level to vacuum the dust from the hood or shrouds. A second machine may be supplied to provide the vacuum air, dust collection, and grit recycling.

In another embodiment the hood may be replaced with individual shrouds mounted to each nozzle for dust and grit collection and recycling.

One possible embodiment of the painting attachment may include one or more paint guns mounted to a linear slide. The attachment may be mounted to oscillating arms. The paint or coating and pressure pumps used for painting or coating may be supplied from an external source.

The machine may be manually controlled by an operator via a radio remote controller. This allows the operator to control the machine remotely from a safe and ergonomical location, and prevents the operator from having to be at the operating height of the boom. Alternatively, software in combination with position sensors may allow for the working apparatus to automatically move in a linear motion in any plane with a single input from the operator and thus form an automated or robotic system. The lift, telescope, and swing of the boom and the roll, pitch, and yaw of the working apparatus may be automatically synchronized in order to ensure a linear movement from one work position to the next.

Alternatively, software in combination with position sensors and distance sensors, may allow for the working apparatus to automatically follow the contour of the working surface and thus form an automated or robotic system. The lift, telescope, and swing of the boom and the roll, pitch, and yaw of the working apparatus may be automatically synchronized in order to ensure linear directional movement, constant working apparatus speed, and distance during the working process.

A remotely controlled mobile device for working a surface, a lifting boom, a quick detach system, may include a plurality of different working apparatus. One working apparatus being a support bracket with one or more high pressure water washing nozzles mounted to moveable supports. A second working apparatus includes one or more ultra-high pressure water surface cleaning nozzles mounted to moveable supports. A third working apparatus includes one or more abrasive grit blast nozzles mounted to moveable supports and a hood or shrouds to confine and allow the collection of dust, abrasive grit, and paint removed during grit blasting. A fourth working apparatus includes one or more abrasive air blast nozzles mounted to moveable supports and a hood or shrouds to blow off and confine and allow the collection of dust, abrasive grit, and paint left on the working surface during grit blasting. A fifth working apparatus includes a supporting bracket with one or more painting heads mounted to a moveable mount, which can be used to paint the cleaned surface. The various working apparatus are supported by the boom and three rotary actuators such that they can be accurately moved around five axes.

BRIEF DESCRIPTION OF THE DRAWING FIGURES

Figure 8:
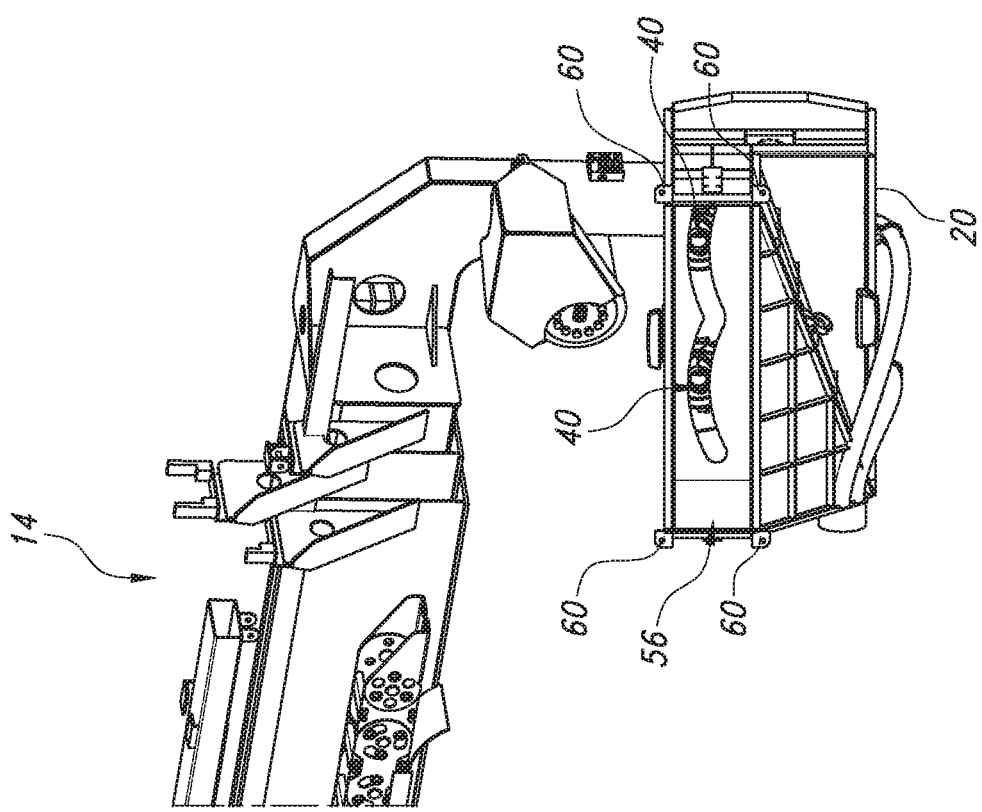
Figure 9:
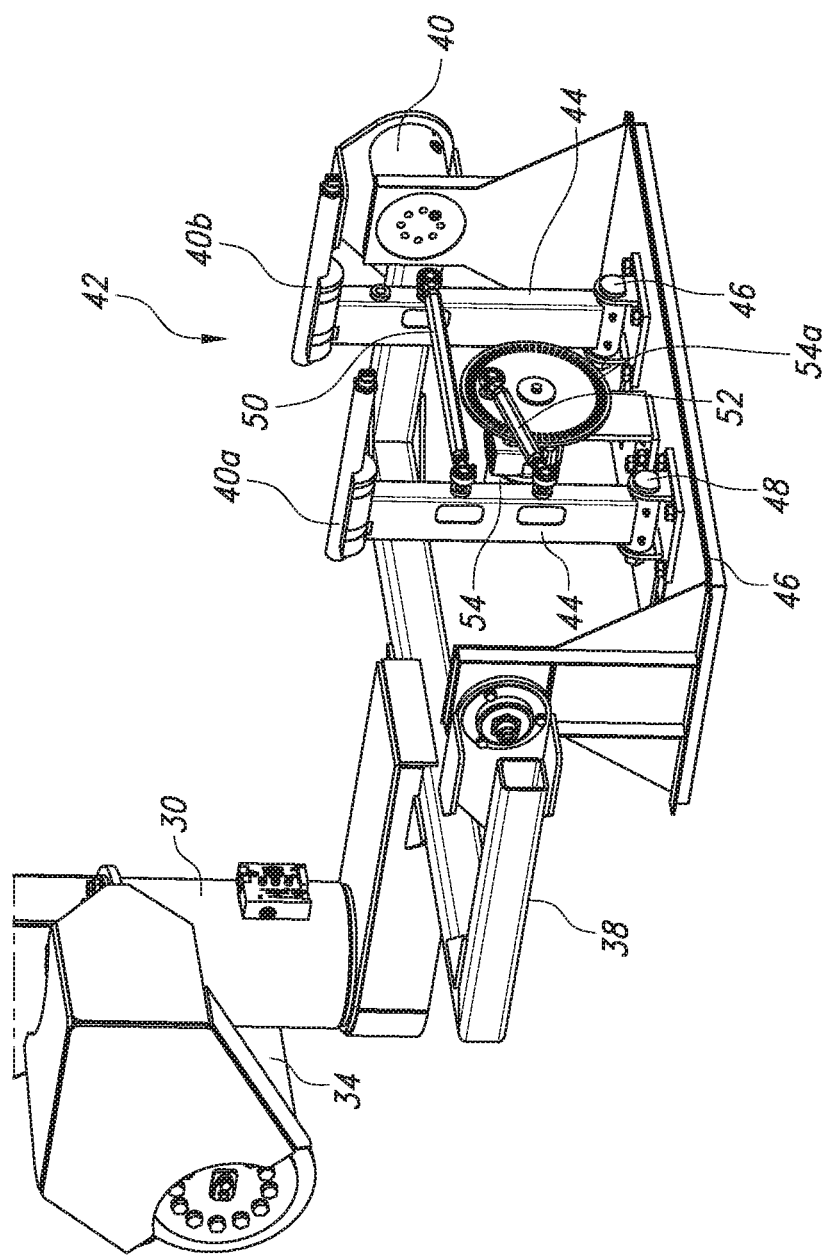
Figure 10:
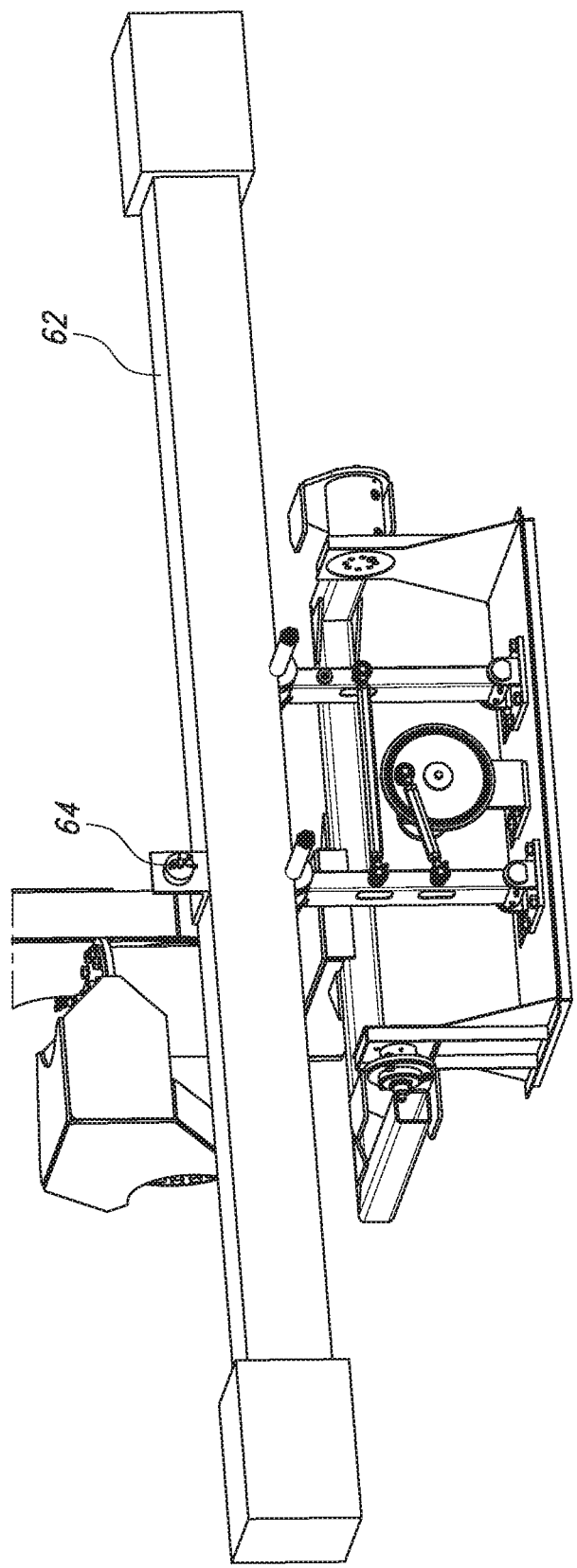
Figure 11:
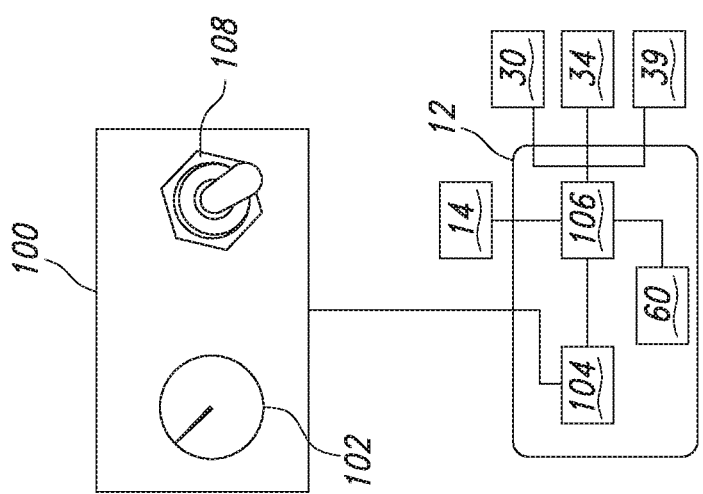
Figure 12:
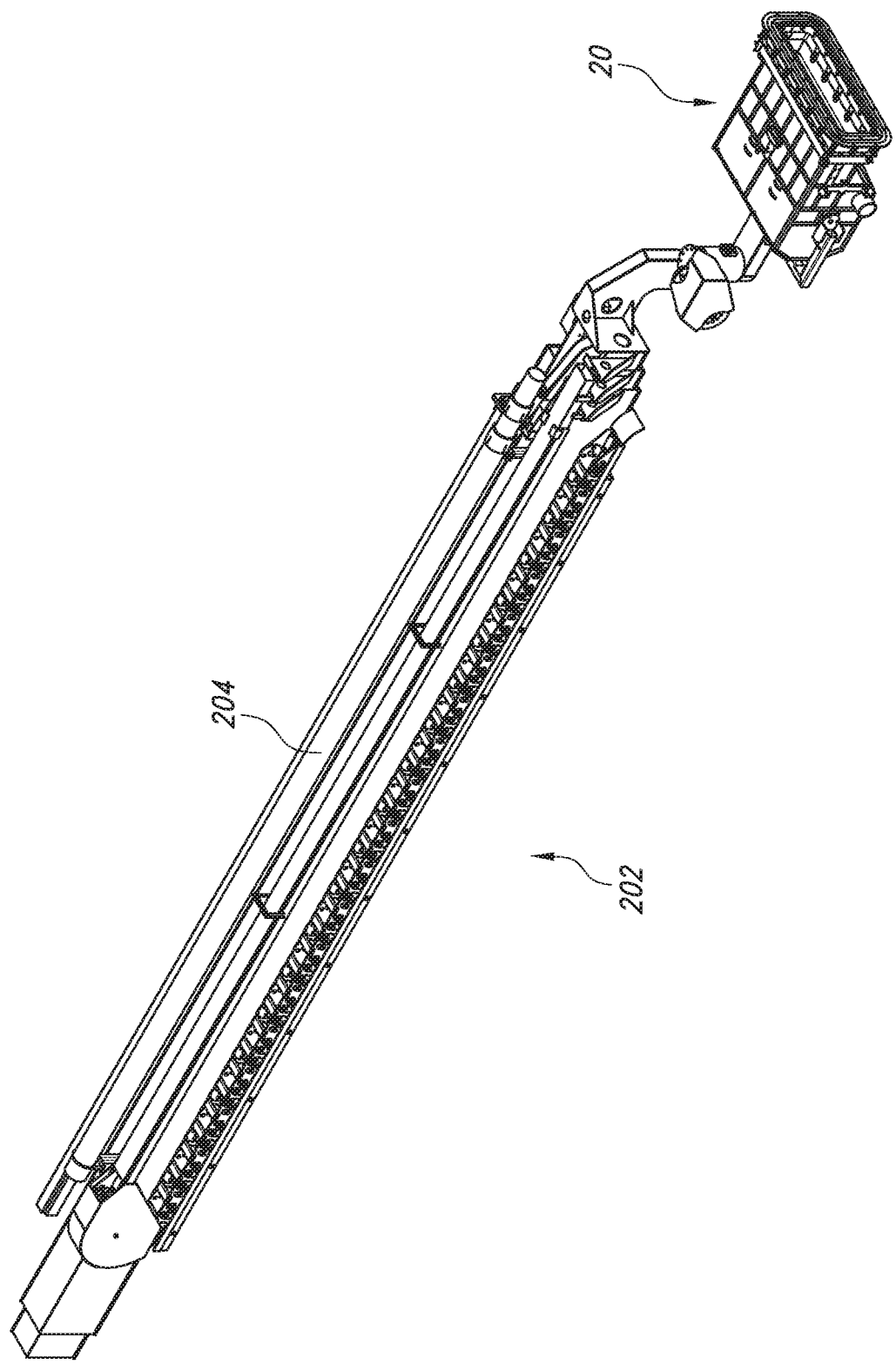

FIGS. 4, 5, 6, and 7 illustrate possible orientations of the machine;

FIGS. 8, 9, and 10 illustrate various working apparatus for use in connection with the machine;

FIG. 11 schematically illustrates a control arrangement for the machine; and FIGS. 12, 13, 14, 15, 16, and 17 illustrate an extensible boom including a telescoping conduit for delivering fluid to or from the working apparatus.

DETAILED DESCRIPTION

Figure 1:
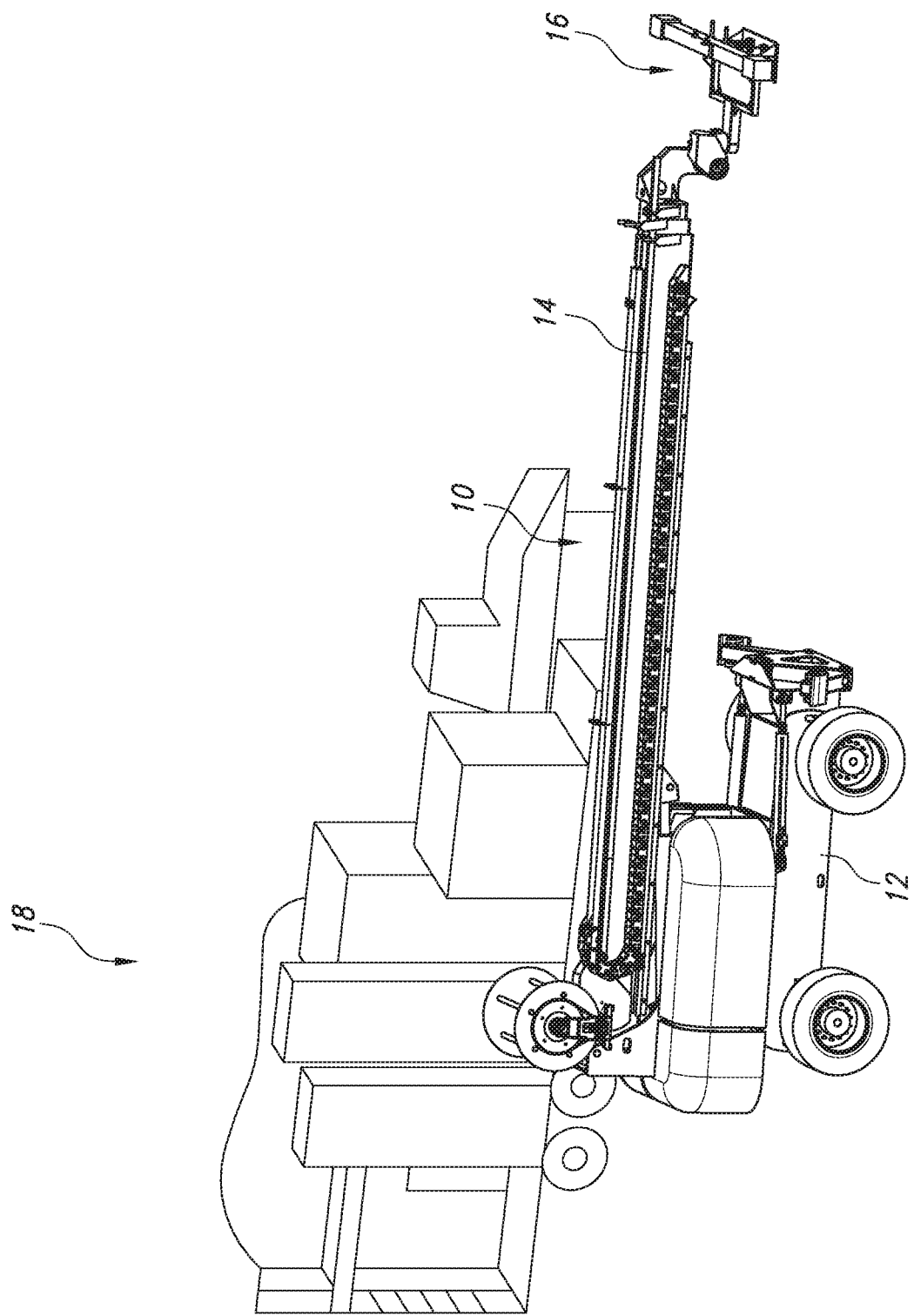
FIG. 1 is a perspective view of a multi-purpose machine accord to one aspect of the disclosure.
Figure 2:
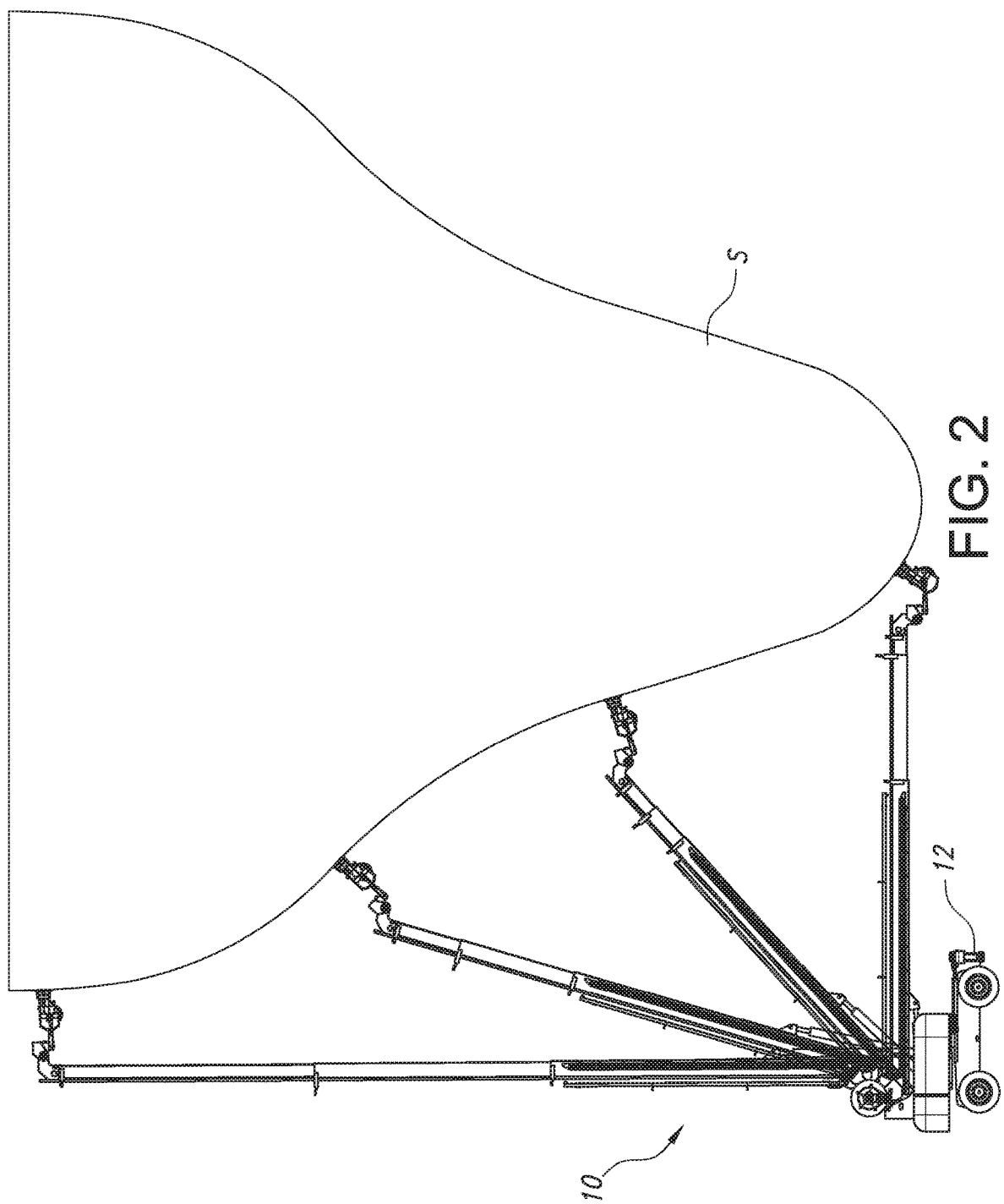
FIG. 2 illustrates one possible use of the machine of FIG. 1.

Reference is now made to FIGS. 1-2, which illustrate one embodiment of a machine 10 for use in connection with a surface in need of treatment, such as for example, the hull of a ship S, as shown in FIG. 2 (but it could be any object in need of surface treatment, including but not limited to buildings, towers, tanks, or the like). The machine 10 may include a mobile base in the form of a vehicle 12, which may have wheels or the like for moving about, and an extensible boom 14 (shown as having three sections, each of which may be associated with a linear actuator, such as a hydraulic cylinder, and which may further include a boom swing cylinder for side-to-side movements) to which a working apparatus 16 is attached. The machine 10 may also be used in connection with a mobile unit 18 for recycling any abrasive material used during a blasting operation.

Figure 3:
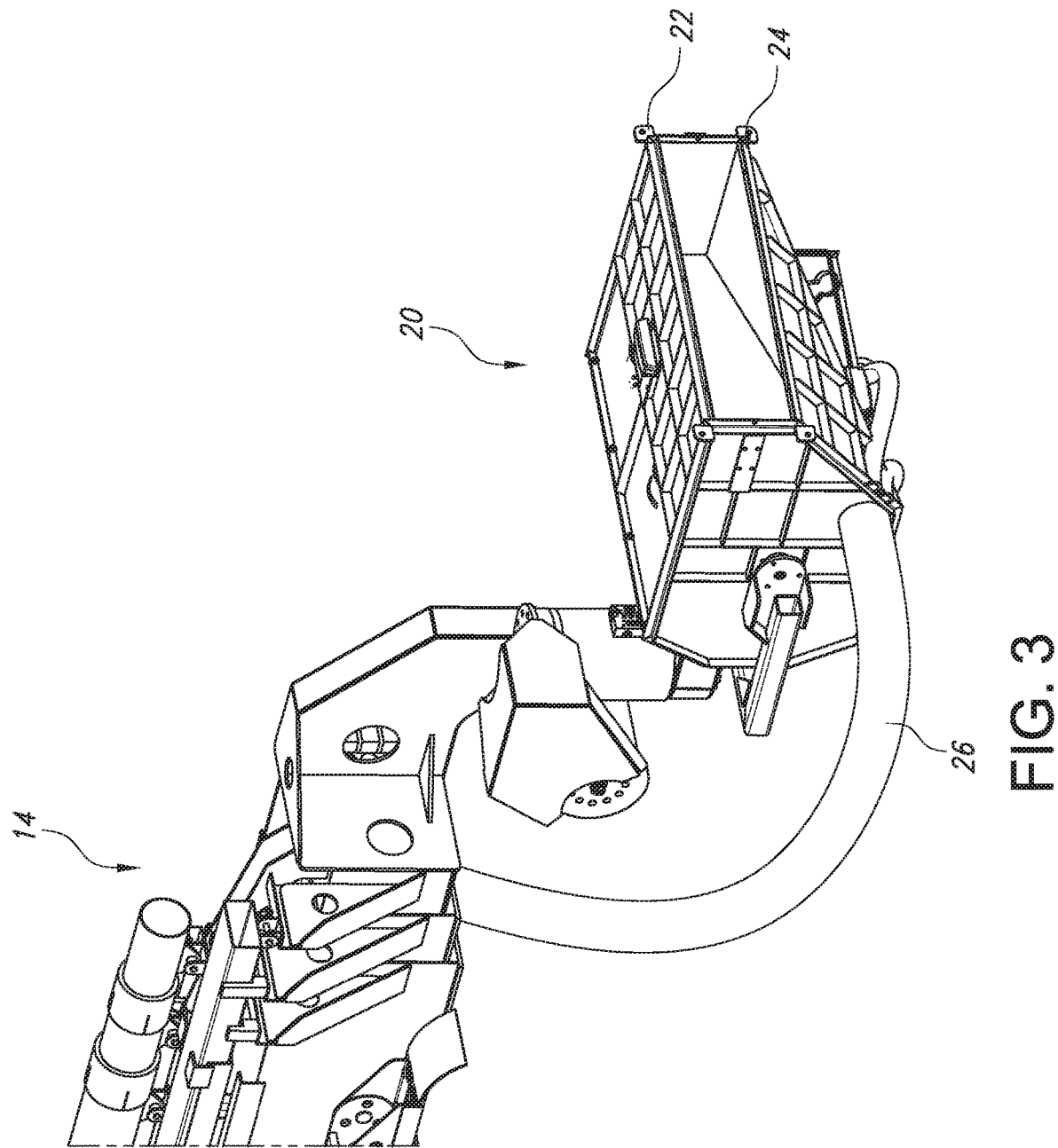
FIG. 3 is a cutaway perspective view of a portion of the machine.
Figure 4:
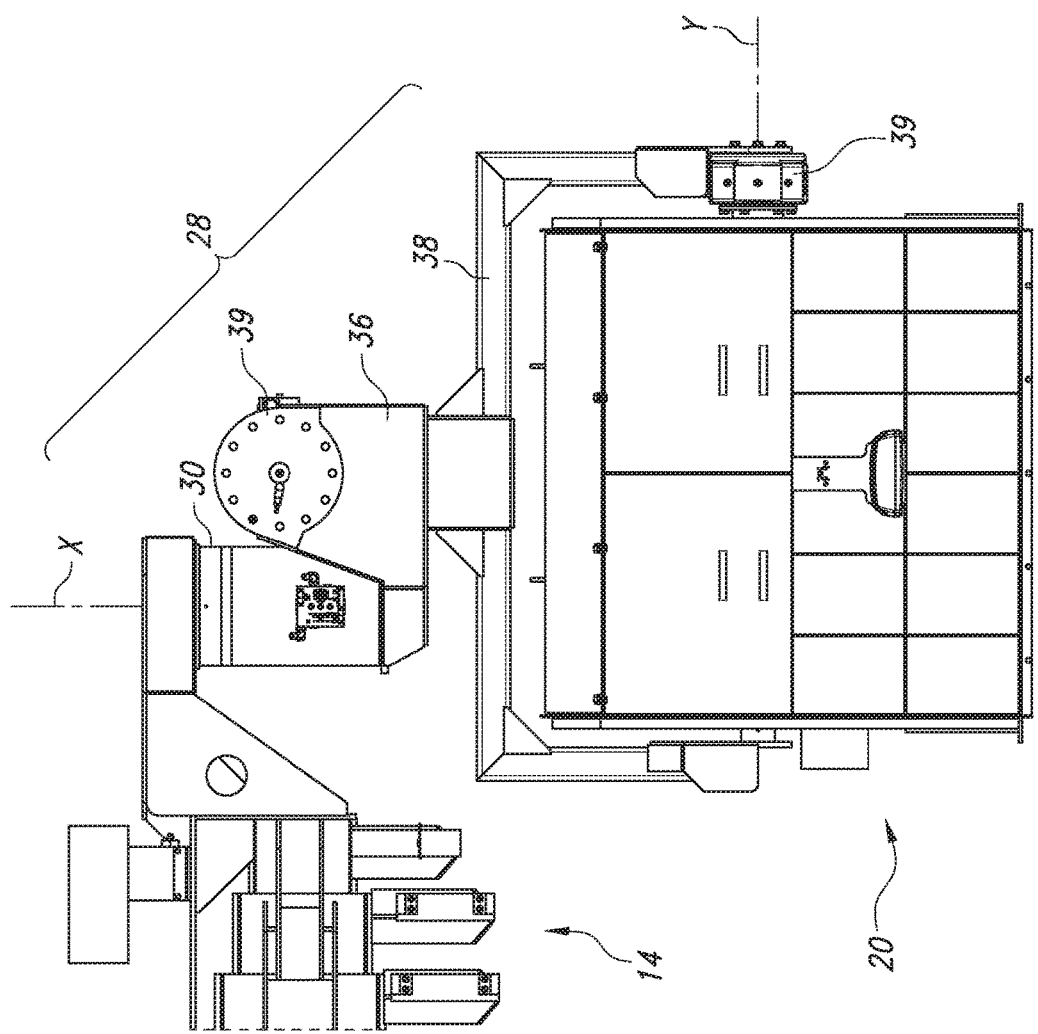
Figure 5:
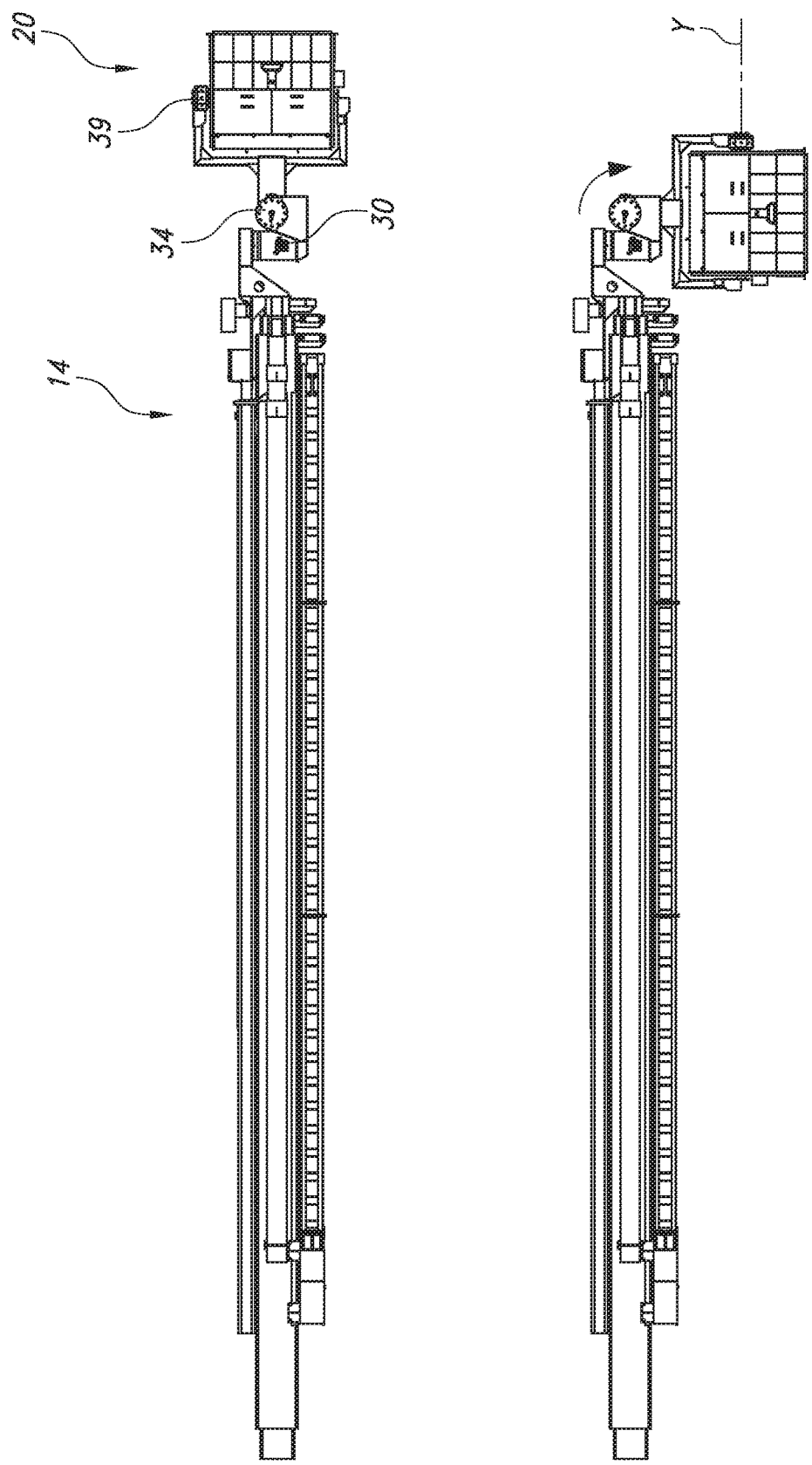
Figure 6:
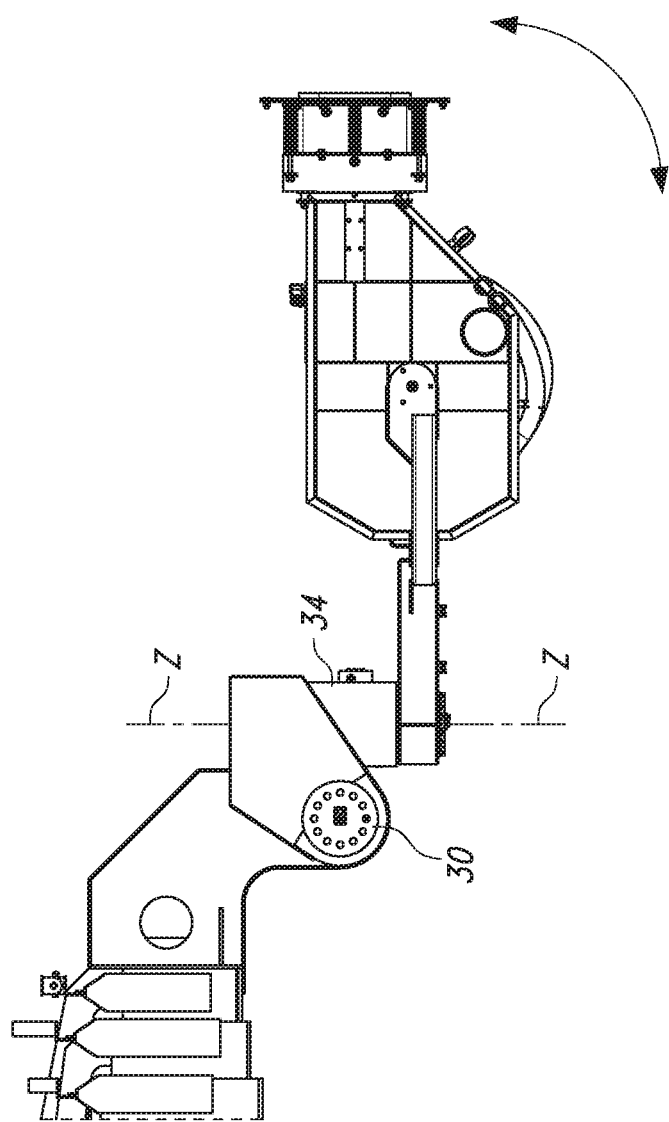
Figure 7:
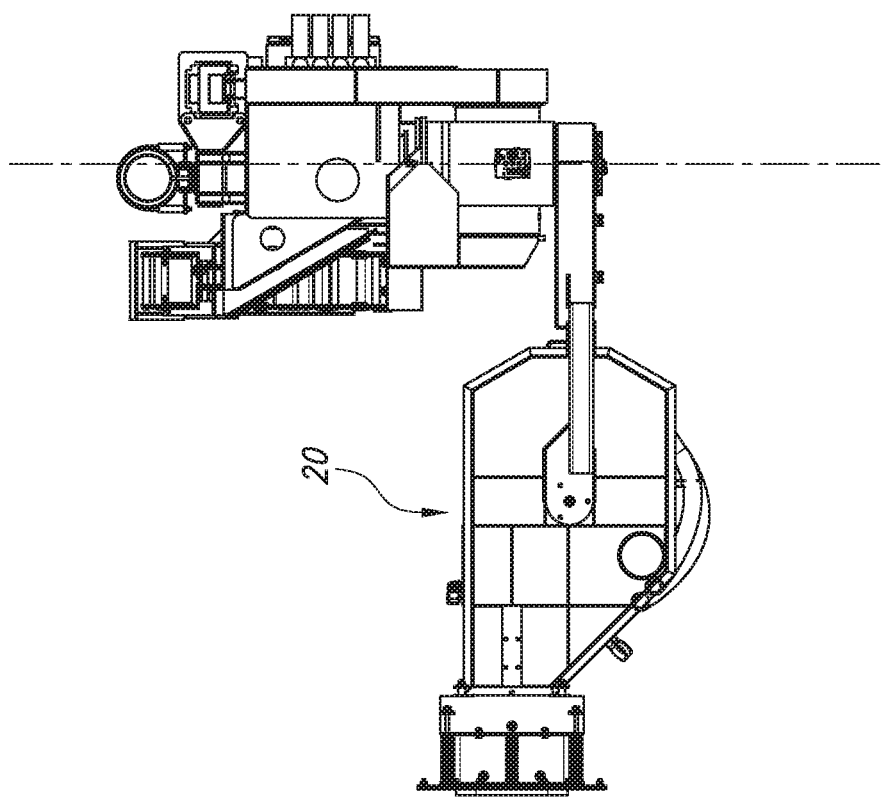

With reference to FIG. 3, the working apparatus 16 may comprise a hood 20, which may be connected to the boom 14 for relative movement. The hood 20 may comprise an outlet 22 for directing any sprayed material (paint, grit, water) onto an adjacent surface to be worked. A seal 24 may partially or fully surround the outlet 22, which is shown as being rectangular and having a width that is substantially greater than its height. In situations where the sprayed material is to be recovered, a vacuum may also be applied to the hood 20, such as via a hose 26 or like conduit extending along the boom 14, which vacuum may be generated by the mobile unit 18.

Turning to FIGS. 4, 5, 6, and 7 it can be understood that the hood 20 may be connected to the boom 14 by an actuator arrangement 28 that allows for independent movement about three independent axes. The actuator arrangement 28 may include a first rotary actuator 30 connected between a distal end of the boom 14 and a support 32 controls the rotation or roll of the hood about a first, horizontal axis X, which would typically extend parallel to the surface to be worked. A second rotary actuator 34 connected between the support 36 and a yoke 38 for receiving the hood 20 controls the rotation (yaw) about a vertical axis Z. A third actuator 39 extends between the yoke 38 and the hood 20, and controls its position (pitch) relative to a third axis Y, which is shown as transverse in FIG. 4 but would be generally parallel to the axis X in the home condition. In connection with the adjustable reach function provided by extending or retracting the boom 14, this allows for the hood 20 to be moved and reoriented in real time for matching the contour of a surface in need of treatment (which in the example of a hull of a ship S, may comprise a surface including multiple complex curves of varying degrees of curvature). One example of a rotary actuator that may be used in connection with the machine 10 is the "Series 10" distributed by Helac (helac.com) of Enumclaw, Wash.

Referring to FIGS. 8 and 9, it can be appreciated that the hood 20 may include one or more implements for spraying fluid onto the surface to be worked. In one embodiment, these implements may comprise one or more nozzles 40 for distributing fluid from the outlet 22 of the hood. In one embodiment, a pair of nozzles 40*a*, 40*b* is provided, which are connected to an actuator 42 for moving the nozzles relative to the hood 20, and thus controlling the position and direction of any fluid emanated therefrom.

In the illustrated embodiment, and as perhaps best shown in FIG. 9 (with the outer housing of the hood 20 removed for clarity), the actuator 42 comprises an upstanding support 44 for supporting each nozzle 40. Each support 44 may be connected to the hood 20, such as along a platform 46 therein, so as to be capable of pivoting movement (note pivot pins 48). A first link 50 connects the supports 44, and a second link 52 connects one of the supports 44 to a rotary actuator, such as a motor 54.

Rotation of the motor 54 thus causes the supports 44 to move to and fro in a reciprocating manner, and thus causes the nozzles 40*a*, 40*b* to distribute fluid along the entire width of outlet 22 (and also with some degree of vertical variation as a result of the pivoting nature of the supports 44); as shown in FIG. 8, a shield 56 with a suitable cutout may be provided for shielding the actuator 42 against any reflected debris). The speed of oscillation may be monitored by counting the passage of perforations in a disc 54*a* associated with the motor 54. Oscillating movement of the nozzles 40 allows for a narrower outlet 22 or throat on the hood 20 for dust or grit collection versus using a rotary motion of the nozzles.

FIG. 8 also illustrates that the hood 20 may incorporate one or more sensors 60 for sensing a distance of the outlet 22 relative to the surface to be worked. The sensors 60 may comprise laser distance sensors, but other forms of sensors could be used.

As noted previously, the machine 10 may be adapted for performing functions other than cleaning or blasting. Thus, for instance, and with reference to FIG. 10, the supports 44 may be connected to a painting apparatus, which may comprise a linear actuator 62 supporting a spray nozzle 64, which may be connected to a remote source of paint via a suitable supply line (not shown). The spray nozzle 64 may thus be reciprocated to and fro via the actuator 62 to paint a surface adjacent to the hood (not shown in FIG. 10 for purposes of clarity). This embodiment could also be used in connection with cleaning fluids, such as water, air, or fluid-entrained with grit.

In terms of use, and with reference to FIG. 11, a remote control 100 may be provided to create a man/machine interface. A selector switch 102 may be provided to allow the operator to choose various functions, and control signals may be wirelessly transmitted to a controller 104 associated with the vehicle 12 for controlling the various movements and operations of the machine 10. This allows the operator to control the machine 10 remotely from a safe and ergonomic location, and prevents the operator from having to be positioned at the operating height of the boom.

The controller 104 may serve several functions, such as monitoring and control of the engine for providing power, monitoring of fuel level, monitoring of position sensors (rotary encoders and linear transducers associated with the boom swing cylinders and the roll, pitch, and yaw rotary actuators on the working apparatus all have position transducers so that the exact location in three dimensions of the working apparatus can be monitored), monitoring of pressure transducers, control of pre-start warning and fault alarms, tramming of the machine 10 and basic manual control functions, and communication with the onboard machine logic controller 106.

In one possible mode of operation, the operator uses the remote control 100 to first check for any fault conditions. The operator then selects "tram mode" and then uses the controller 100 to start the machine 10 and move it to the work site and into operating position. Next, the operator uses "manual mode" and electric joysticks 108 to manually position the "working apparatus" (grit blaster, pressure washer, or paint head) within a reasonable proximity of the working surface (approximately 2').

At this point, the operator may change the selector 102 from "manual" to "position" mode. The operator can now activate the "position switch" to cause the working apparatus to automatically move to a specified distance from the working surface and to automatically align itself parallel to the working surface. This allows precise positioning with one button even when the working apparatus (hood 20) may be too far from the operator for accurate visual estimating of position.

To accomplish this, the remote control 100 sends a signal to the controller 104. The controller 104 then sends a signal to the machine logic controller 106. The machine logic controller 106 then receives as inputs the positions of the boom lift and boom swing cylinders and the position transducers on the roll, pitch, and yaw rotary actuators to calculate the exact location of the hood 20 in three dimensions. It also uses the inputs from four distance sensors 60 to determine the distance to the working surface of all four corners of the hood 20. Algorithms may then be used to calculate the required movements of the boom extension and swing cylinders and rotary actuators to move the hood to the correct offset from the surface and to align it parallel to the working surface.

Once the apparatus 16 is in position, the operator then selects the "blasting mode" and initiates blasting by moving a joystick 108 in the desired direction of movement. In this mode, the machine logic controller 106 monitors the position of the apparatus 16 with respect to the working surface and automatically actuates any or all of the actuators to maintain the correct offset from the surface and to align it parallel to the working surface as the apparatus 16 is moving along the desired path. This allows for the apparatus 16 to automatically follow the contour of the working surface and thus form an automated or robotic system. The lift, telescope, and swing of the boom and the roll, pitch, and yaw of the working apparatus may be automatically synchronized in order to ensure linear directional movement, constant speed, and distance from the working surface during the working process.

The path is defined by first orienting the working apparatus in a specific direction (horizontal, perpendicular, or at any angle parallel to the working surface). The machine logic controller 106 then uses the position transducers to calculate a straight-line path relative to the working apparatus vector orientation. The hood 20 is only "allowed" to move up or down relative the vector of the working apparatus 16 in this mode. For example, if the hood 20 is horizontal, it can only move vertically up and down. If it is turned to a vertical orientation, then it can only move right to left. If it is oriented at a 45 degree angle, it can only move up or down along the 45 degree angled path. Algorithms may be used to calculate the pathway based on the vector orientation. Algorithms may also be used to calculate the "kinematic movements" of the boom lift, boom swing and operating means roll, pitch, and yaw as required to follow this path.

The operator can manually select the desired linear movement speed of the apparatus 16 with a speed selector. During actual blasting, the machine logic controller 106 uses the speed selection input, the vector algorithm, the kinematic algorithm, and the inputs from all position and distance sensors to automatically actuate any or all of the rotary actuators to maintain the working apparatus linear speed, to maintain the correct offset from the surface, to maintain alignment of it parallel to the working surface as the working apparatus is moving along the desired path, and to move it in the direction selected by the operator. All of this is maintained independent of the varying boom length, boom orientation vertically, or boom angle with respect to the chassis.

Once the apparatus 16 has actually begun moving, the machine logic controller 106 automatically actuates the nozzle 40 or nozzles (grit blast nozzle, blow down nozzle, pressure washer, blaster nozzle, or paint nozzle). It also automatically actuates the movement of the nozzle 40 via actuator 42 or 62. In the case of the grit blast, blow down, and washer nozzles, these may be mounted on the supports 44, which are moved back and forth similar to windshield wipers in an arc. The speed at which the supports 44 and therefore the nozzles 40 oscillate back and forth are controlled by an algorithm based on the linear speed of the working apparatus. The machine logic controller 106 monitors the linear speed of apparatus 16 and automatically adjusts the oscillation speed accordingly.

Once the working apparatus has reached the end of path, the operator releases the joystick 108 which stops movement, turns off the nozzles 40, and turns off the oscillation of the supports 44. This automated sequence is significant to prevent such things as grit blasting in one spot for an extended period of time which could blast a hole thru the working surface.

The operator may then select the "boom position mode" to move the apparatus 16 to the next adjacent path area. In this mode, the apparatus 16 is allowed to be moved up, down, right, or left along a vector path which is controlled by the machine logic controller 106. Kinematic vectoring control allows for the working apparatus 16 to move in a linear motion in any plane with a single input from the operator and thus form an automated or robotic system. The lift, telescope, and swing of the boom and the roll, pitch, and yaw of the working apparatus may be automatically synchronized in order to ensure a linear movement from one work position to the next.

The machine logic controller 106 uses the position transducers (no distance sensor is involved) to calculate a straight line path relative to the working apparatus vector orientation. The machine logic controller 106 uses the vector algorithm, the kinematic algorithm, and the inputs from all position sensors to automatically actuate any or all the actuators to move the working apparatus along the desired path, selected by the operator. Due to the need to control boom swing, boom extend, and three axis of movement of the apparatus 16 during movement from one working path to the next adjacent working path (in normal operation the operator will make a vertical pass up, move the head over 30 inches, and then make a vertical pass down) the operator would typically be required to control five separate functions manually. Kinematic vectoring control allows the operator to only control one thing, the vector direction with a single handle movement.

After moving to the new path location the operator then repeats the process using the positioning and blasting modes. Once the reachable area is blasted the machine is repositioned and the process is repeated.

A further aspect of the disclosure is now described with reference to FIGS. 12-17. Specifically, an extensible or telescoping boom 202 is provided having a telescoping conduit 204 connected thereto for communicating fluid along the boom as it is extended or retracted. In the context where the boom 202 is used in connection with a machine 10 for blasting a surface, a forward or distal end of the conduit 204 may communicate with a blasting apparatus, such as the multi-purpose hood 20, and a proximal or rear end of the conduit may communicate with a collector (not shown). At each end, a short section of flexible hose (not shown) may be provided to form the remaining connection.

Figure 13:
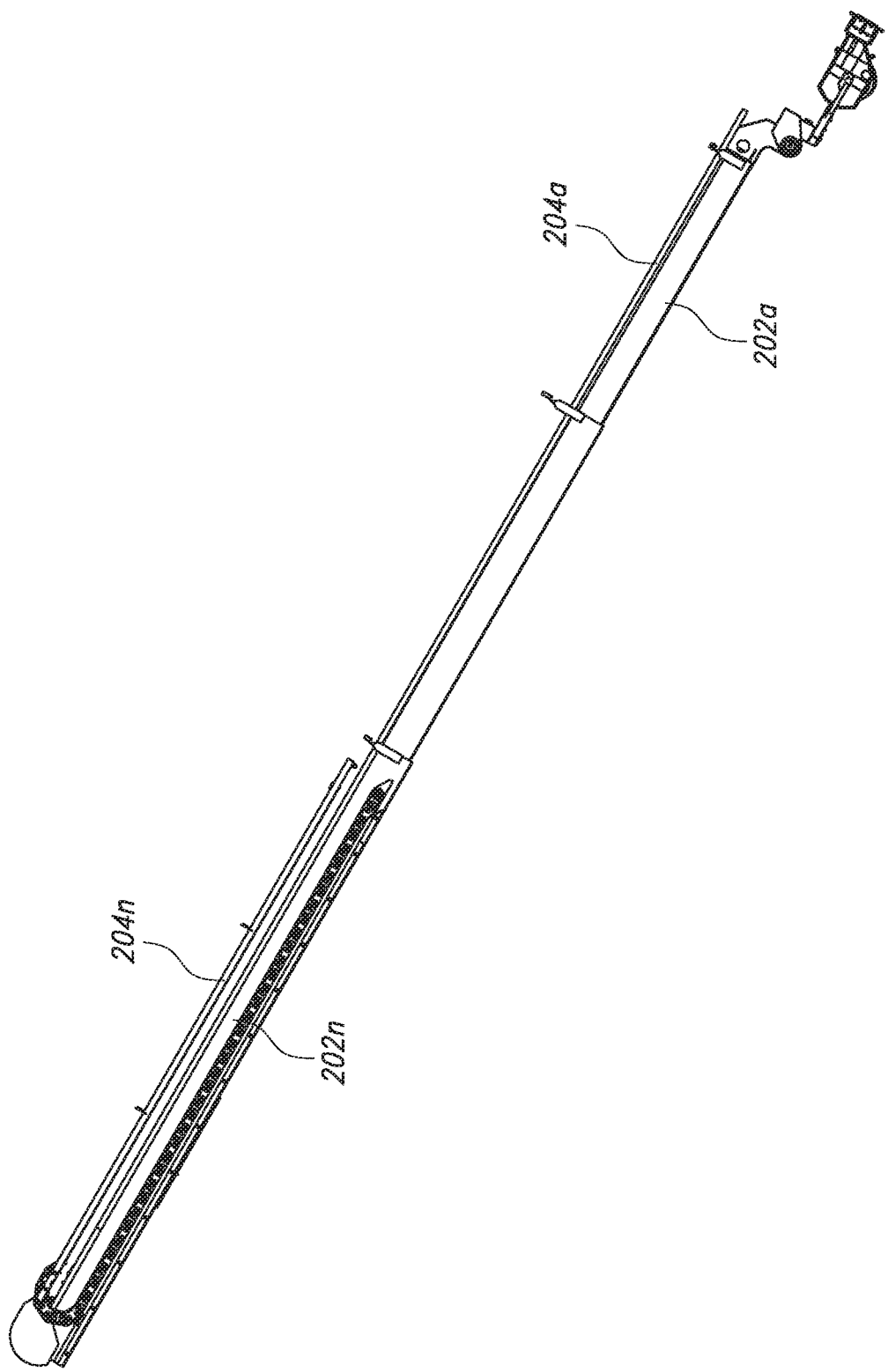
Figure 14:
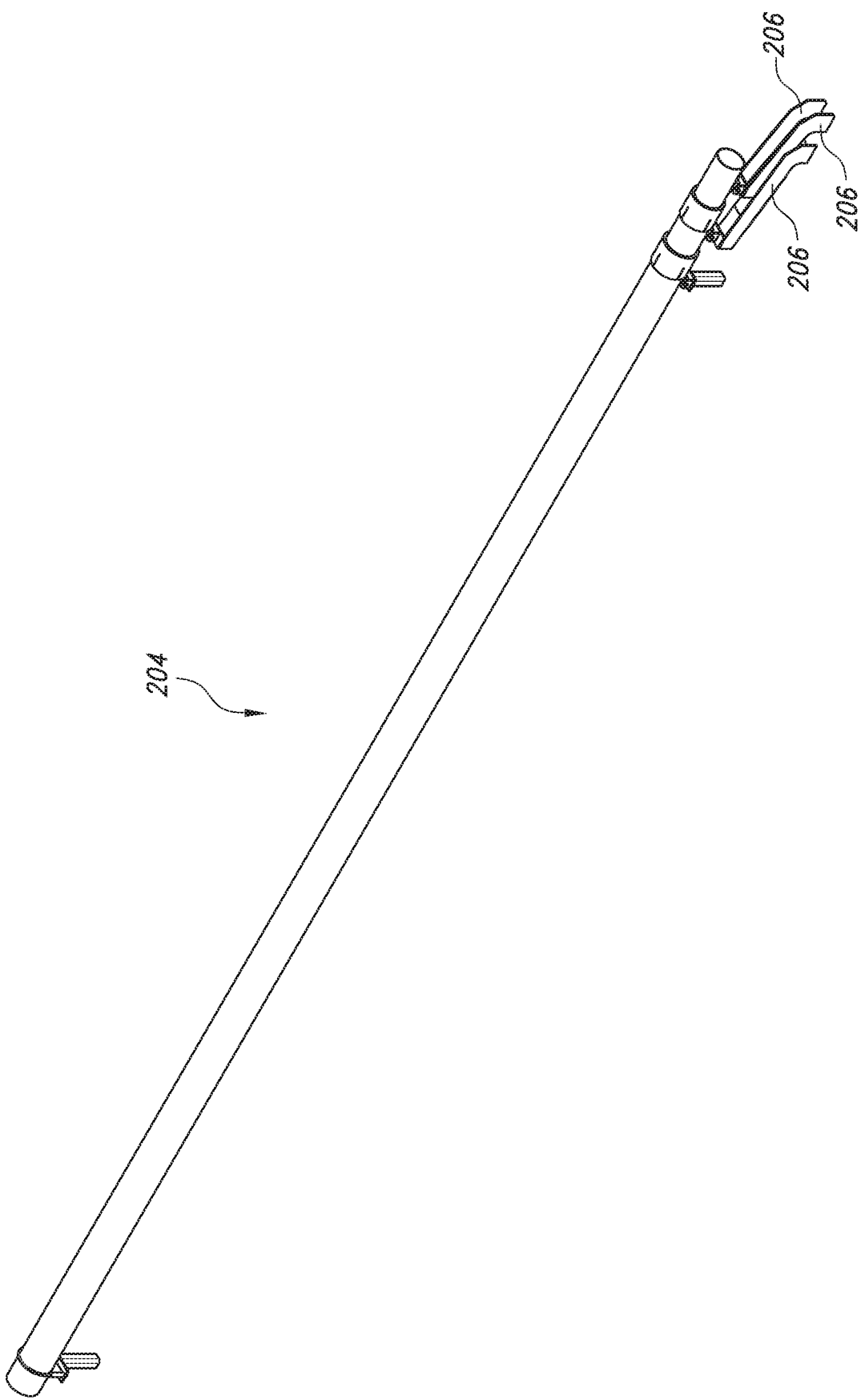
Figure 15:
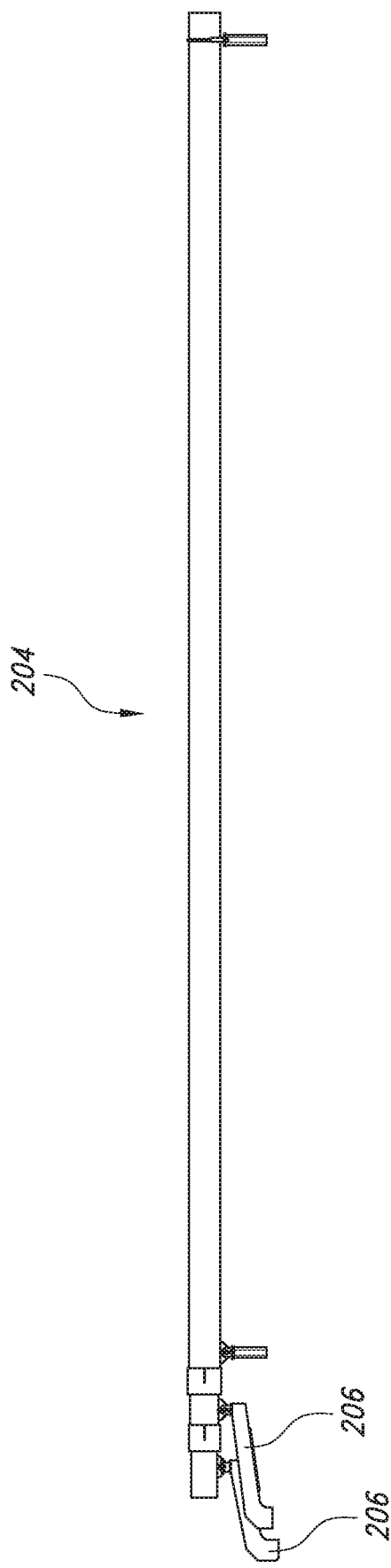
Figure 16:
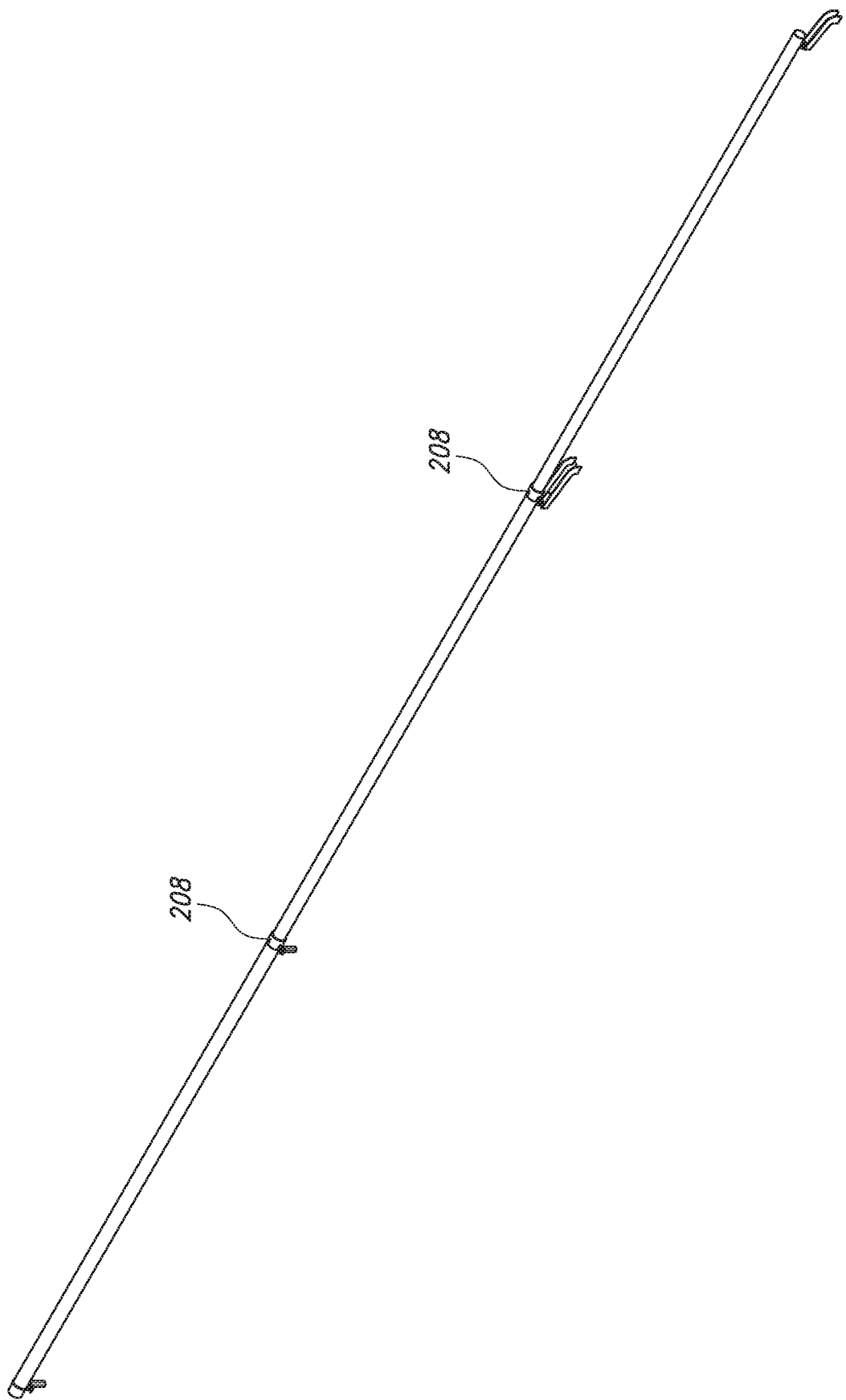
Figure 17:
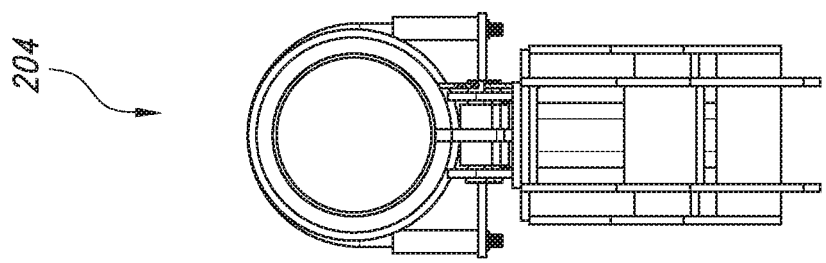

As perhaps best understood from FIG. 13, the conduit 204 may have a number of sections 204a . . . 204n, each corresponding to one of the boom sections 202a . . . 202n (one of which may be stationary, associated with a base boom section). One or more supports 206 may be provided for supporting each conduit section 204a . . . 204n from the corresponding boom section 202a . . . 202n. As indicated in FIG. 14, the supports 206 may nest in the collapsed condition of the boom 202 and conduit 204. Connectors 208 may also be provided that allow for the telescoping of the conduit sections 204a . . . 204b, while maintaining a fluid tight seal.

Each of the following terms written in singular grammatical form: "a", "an", and the", as used herein, means "at least one", or "one or more". Use of the phrase "one or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic^), parameters), integers), or step(s), and does not preclude addition of one or more additional components), feature(s), characteristics), parameters), integer(s), step(s), or groups thereof. Each of these terms is considered equivalent in meaning to the phrase "consisting essentially of." Each of the phrases "consisting of and "consists of, as used herein, means "including and limited to."

The phrase "consisting essentially of, as used herein, means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range from 1 to 6" also refers to, and encompasses, all possible sub-ranges, such as from 1 to 3", from 1 to 4", from 1 to 5", from 2 to 4", from 2 to 6", from 3 to 6", etc., and individual numerical values, such as "1.3", "2, "2.8", "3", "3.5", "4", "4.6", "5", "5.2", and "6", within the stated or described numerical range of from 1 to 6". This applies regardless of the numerical breadth, extent or size, of the stated numerical range.

Moreover, for stating or describing a numerical range, the phrase "in a range of between about a first numerical value and about a second numerical value", is considered equivalent to, and meaning the same as, the phrase "in a range of from about a first numerical value to about a second numerical value", and, thus, the two equivalents meaning phrases may be used interchangeably. For example, for stating or describing the numerical range of room temperature, the phrase "room temperature refers to a temperature in a range of between about 20° C. and about 25° C., and is considered equivalent to, and meaning the same as, the phrase "room temperature refers to a temperature in a range of from about 20° C. to about 25° C.

Terms of approximation, such as the terms about, substantially, approximately, etc., as used herein, refers to ±10% of the stated numerical value.

The phrase "operatively connected", as used herein, equivalently refers to the corresponding synonymous phrases "operatively joined", and "operatively attached," where the operative connection, operative joint or operative attachment, is according to a physical, or/and electrical, or/and electronic, or/and mechanical, or/and electro-mechanical, manner or nature, involving various types and kinds of hardware or/and software equipment and components.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

The invention claimed is:

1. An apparatus for treating a surface, comprising:
a vehicle including an extensible boom; and
a hood attached to the extensible boom, the hood including at least one nozzle for spraying a substance through an outlet of the hood onto the surface, the at least one nozzle configured for reciprocating, non-rotational movement in a generally linear direction relative to the outlet in the hood; and
a first actuator for actuating the at least one nozzle, wherein the at least one nozzle comprises a grit-blasting nozzle, and the first actuator comprises a linkage connected to a rotary motor.

2. The apparatus of claim 1, wherein the at least one nozzle of the hood includes a plurality of nozzles configured for reciprocating movement.

3. The apparatus of claim 1, wherein the extensible boom is connected to a telescoping conduit for communicating fluid along the extensible boom to or from the hood.

4. The apparatus of claim 3, wherein the at least one nozzle is configured for reciprocating movement in a generally linear direction relative to the outlet.

5. The apparatus of claim 1, wherein the hood is configured for rotating independently about three different axes.

6. The apparatus of claim 5, further including a second actuator for controlling a roll of the hood, a third actuator for controlling a yaw of the hood, and a fourth actuator for controlling a pitch of the hood.

7. The apparatus of claim 6, further including a fifth actuator for controlling an extension of the boom and a sixth actuator for controlling a swing of the boom.

8. The apparatus of claim 1, wherein the outlet of the hood is connected to a vacuum source.

9. The apparatus of claim 1, further including a controller for automatically controlling the movement of the hood along the surface.

10. The apparatus of claim 9, wherein the controller is adapted to move the hood in a linear path along a predetermined angle.

11. An apparatus for treating a surface, comprising:
a vehicle including an extensible boom; and
a hood attached to the extensible boom, the hood configured for rotating independently about three different axes;
at least one grit-blasting nozzle; and
a first actuator for actuating the at least one grit-blasting nozzle, the actuator comprising a linkage connected to a rotary motor.

12. The apparatus of claim 11, further including a second actuator for controlling a roll of the hood, a third actuator for controlling a yaw of the hood, and a fourth actuator for controlling a pitch of the hood.

13. The apparatus of claim 12, further including a fifth actuator for controlling an extension of the extensible boom and a sixth actuator for controlling a swing of the extensible boom.

14. The apparatus of claim 11, wherein the at least one grit-blasting nozzle is configured for reciprocating movement in a generally linear direction relative to the outlet.

15. The apparatus of claim 14, wherein the at least one grit-blasting nozzle of the hood includes a plurality of nozzles adapted for reciprocating movement.

16. The apparatus of claim 11, wherein the extensible boom is connected to a telescoping conduit for communicating fluid along the boom to or from the hood.

17. The apparatus of claim 11, wherein the hood includes at least one nozzle for spraying a fluid through an outlet of the hood, the at least one spraying nozzle adapted for reciprocating, non-rotational movement in a generally linear direction relative to the outlet in the hood.

18. An apparatus for treating a surface, comprising:
a vehicle including an extensible boom; and
a hood attached to the extensible boom, the hood including at least one nozzle for spraying a substance through an outlet of the hood onto the surface, the at least one nozzle configured for reciprocating, non-rotational movement in a generally linear direction relative to the outlet in the hood; and
a first actuator for actuating the at least one nozzle, wherein the at least one nozzle comprises a grit-blasting nozzle, and the first actuator comprises a linkage connected to a rotary motor;
wherein the hood is configured for rotating independently about three different axes.

* * * * *